(12) United States Patent
Chabanne et al.

(10) Patent No.: US 7,828,213 B2
(45) Date of Patent: Nov. 9, 2010

(54) RF LABEL IDENTIFICATION

(75) Inventors: Hervé Chabanne, Paris (FR); Emmanuelle Dottax, Paris (FR); Julien Bringer, Paris (FR)

(73) Assignee: Morpho, Paris (FR)

( * ) Notice: Subject to any disclaimer, the term of this patent is extended or adjusted under 35 U.S.C. 154(b) by 1037 days.

(21) Appl. No.: 11/557,327

(22) Filed: Nov. 7, 2006

(65) Prior Publication Data

US 2008/0048035 A1 Feb. 28, 2008

(30) Foreign Application Priority Data

Nov. 8, 2005 (FR) ................................. 05 11350

(51) Int. Cl.
*G06K 7/08* (2006.01)
(52) U.S. Cl. ...................... 235/451; 235/487; 235/492; 235/493; 713/168; 340/572.1
(58) Field of Classification Search ................. 235/451, 235/487, 492, 493; 340/572.1; 713/168
See application file for complete search history.

(56) References Cited

U.S. PATENT DOCUMENTS 5,931,917 A * 8/1999 Nguyen et al. .............. 709/250
6,076,163 A * 6/2000 Hoffstein et al. ............ 713/168

OTHER PUBLICATIONS

Stephen A Weis, "Security Parallels Between People and Pervasive Devices", from the *Pervasive Computing and Communications Workshops*, 2005 Third IEEE International Conference on Kauai Island, Hawaii, USA, Mar. 8-12, 2005, Piscataway, NJ, IEEE Mar. 8, 2005, pp. 105-109, XP010779709, ISBN 0-7695-2300-5.

Henri Gilbert, et al., "An Active Attack Against HB+—A Provably Secure Lightweight Authentication Protocol", published in *Electronic Letters*, IEE Stevenage, Great Britain vol. 41, No. 21, Oct. 13, 2005, pp. 1169-1170, XP006025388, ISSN: 0013-5194.

(Continued)

*Primary Examiner*—Michael G Lee
*Assistant Examiner*—Rafferty Kelly
(74) *Attorney, Agent, or Firm*—Miller, Matthias & Hull

(57) ABSTRACT

In an RF label identification system comprising a label reader and a plurality of labels, a unique and secret identifier being associated with each label, a first random number is sent from a label to the reader. A second random number is then sent from the reader to the label. In the RF label, a value of the encrypted identifier is then obtained by generating third and fourth random numbers in accordance with a probabilistic rule, by transforming the first and second random numbers in accordance with a determined function and by combining the identifier with the first and second random numbers, with the first and second transformed numbers and with the third and fourth random numbers. The value of the encrypted identifier is sent to the reader. After N repetitions of the above process, the reader identifies the RF label as a function of the N values of the encrypted identifier received, of the determined function, of the N first and second random numbers and of the probabilistic rule.

15 Claims, 4 Drawing Sheets

OTHER PUBLICATIONS

French Preliminary Search Report; Feb. 26, 2007; EPO Form 1503 03.82 (P04C02).

Stephen A. Weis; Security Parallels People and Pervasive Devices; Pervasive Computing and Communications Workshops, 2005. PerCom 2005 Workshops. Third IEEE International Conference on Kauai Island, HI, USA Mar. 8-12, 2005, Piscataway, NJ, USA, IEEE, (Mar. 8, 2005), pp. 105-109.

H. Gilbert, M. Robshaw and H. Sibert; Active attack against HB+: a provably secure lightweight authentication protocol; Electronics Letters, IEE Stevenage, GB, vol. 41, No. 21, (Oct. 13, 2005), pp. 1169-1170.

Julien Bringer, et al., "HB++: a Lightweight Authentication Protocol Secure against Some Attacks", *Second International Workshop on Security, Privacy and Trust in Pervasive and Ubiquitous Computing* (SecPerU), Jun. 29, 2006, Lyon, France.

* cited by examiner

RF LABEL IDENTIFICATION

FIELD OF THE DISCLOSURE

The present invention relates to RF (radio frequency) identification systems based on RF labels or RFID (Radio Frequency Identification) chips, and more particularly the protection of data exchanged in such identification systems.

BACKGROUND OF THE DISCLOSURE

FIG. 1 shows an RF identification system comprising an RF label reader 101 that can communicate by radio with a plurality of RF labels 102. An RF label generally consists of a paper or plastic support, an integrated circuit and an antenna. Such RF labels are activated on reception of an activation signal sent by the RF label reader Such RF identification systems can work with low-frequency signals or with high-frequency signals.

In such RF identification systems, an identifier that is unique in the system is associated with each RF label. The reader is then in a position to identify a label on the basis of information sent from said label and as a function of a list of identifiers of the RF labels 102 of the system.

For such an RF identification system to be reliable, each of the identifiers 102 of the RF system must be kept secret between the reader and the respective RF labels. Now, in such a system, the identifier of a label is exchanged between the label and the reader. The reliability of such identification systems then relies in particular on the means of protecting the respective identifiers of the RF labels during certain of these exchanges between the label reader and the RF labels.

Accordingly, to prevent another entity from being able to usurp the identifier associated with a label of the system and then defraud this kind of RF identification system, these exchanges of data may be encrypted.

After being activated by an activation RF signal, an RF label is able to communicate with the RF label reader in accordance with various communication protocols available to the person skilled in the art. For example, an HB (standing for 'Hopper, Blum') protocol enables such communication between a reader and an RF label. According to this protocol, a secret identifier x is known only by the reader and by the RF label. FIG. 2 shows communication between the reader and the RF label in accordance with the HB protocol.

Note that in the examples described hereinafter, the numbers $a_i$ and x used are binary numbers of k bits, k being an integer.

According to the HB protocol, the reader identifies the label by repeating N times a step of encryption of the identifier of the label concerned. During an encryption step of this kind, step i, where i is an integer from 1 to N, the reader sends a message 103 to the RF label indicating a random number $a_i$ in the set denoted $\{0, 1\}^k$ of the binary numbers of k bits. The RF label then encrypts its secret identifier using the random number as sent by the reader.

To carry out this kind of encryption, the label generates a random number $v_i$ and obtains a value of the identifier encrypted in accordance with the following equation:

$$z_i = a_i \cdot x \oplus v_i \quad (1)$$

wherein $v_i$ is generated so that it is part of the set $\{0, 1\}$, with a determined probability $\eta$ that $v_i$ is equal to 1.

Note that the symbol '$\oplus$' indicates an 'exclusive-OR' operation and that the symbol " indicates an 'exclusive-OR' operation on the various results of the 'AND' operations effected bit by bit on the two numbers $a_i$ and x.

This step is therefore repeated N times. Consequently, the RF label reader receives N values $z_i$ for each of which the values of the random number $a_i$ and the random number $v_i$ vary.

The RF label reader knows the determined probability value $\eta$ characterizing the generation of the random number $v_i$. Consequently, from the N values $z_i$ of the encrypted identifier received in the messages 104 and on the basis of the list of secret identifiers associated with the respective RF labels of the system and the N first and second random numbers, the RF label reader is in a position to determine the secret identifier x of the label concerned, on verifying that the equation (1) is false at most a number of times corresponding to $\eta.N$.

However, an active attack on this kind of HB protocol is able to determine the secret identifier x associated with the label concerned. In fact, if an entity inserts itself between the label reader and the RF label, so as to supply to the RF label the same number in place of the random numbers $a_i$ supplied by the reader, that entity is in a position to determine the information on x.

A communication protocol denoted HB+ for an RF identification system offers protection against this kind of active attack by introducing an additional random value during the encryption of the secret identifier of the RF label FIG. 3 shows this kind of HB+ protocol, based on repetition of an encryption step, only one step i being represented.

According to this HB+ protocol, a secret identifier of the label concerned, known to the leader and to said label, is denoted (x, y), where x and y are binary numbers of k bits. In each of the steps i described above, the label sends the RF label leader a message 201 containing a first random number $b_i$. On reception of this first random number $b_i$, the RF label reader sends the label a message 202 containing a second random number $a_i$ Then, on the basis of the first and second random numbers, the RF label sends the label leader a message 203 that indicates a value of its encrypted secret identifier that satisfies the following equation:

$$z_i = a_i \cdot x \oplus b_i \cdot y \oplus v_i \quad (2)$$

wherein $v_i$ is in the set $\{0,1\}$, with a determined probability $\eta$ that $v_i$ is equal to 1, said probability $\eta$ being known to the reader and to the RF label.

During the N repetitions of this encryption step, the label supplies to the label reader N values $z_i$ of the encrypted secret identifier.

Communication under this kind of HB+ protocol is undoubtedly better protected against certain attacks than communication under the HB protocol. However, an active attack wherein an entity inserts itself between the reader and the RF label and, during sending of the message 201, sends a message 202 modified to replace the second random number $a_i$, generated by the reader, with a number $a_i'$ satisfying the following equation:

$$a_i' = a_i \oplus \delta \quad (3)$$

wherein $\delta$ is a number on k bits, which has a constant value throughout the N repetitions of the encryption step, step i.

In this case, the message 203 transmits a number $z_i$ satisfying the following equation:

$$z_i = a_i' \cdot x \oplus b_i \cdot y \oplus v_i = (a_i \oplus \delta) \cdot x \oplus b_i \cdot y \oplus v_i \quad (4)$$

In this kind of, context, if the reader is in a position to identify the label, it is deduced, with a high probability, that $\delta x$ is equal to 0. In the contrary situation, it is deduced that $\delta \cdot x$ is equal to 1. Accordingly, as a function of whether it is impossible or possible for the reader to identify the RF label, the information on the secret identifier x can be deduced. This kind of deductive method can then be transposed to the numbers $b_i$ and y.

There is therefore an active attack that can discover the secret identifier (x,y) of the RF label during communication between the reader and the label under the HB+ protocol. This kind of attack is described in the document 'An active attack against HB+' by Henri Gilbert, Matthew Robshaw and Herveé Sibert.

The present invention aims to improve the protection of communication in an RF identification system against attacks seeking to discover the secret identifiers of the RF labels.

SUMMARY OF THE DISCLOSURE

A first aspect of the present invention proposes a method of identifying an RF label in an RF label identification system comprising an RF label reader and a plurality of RF labels, a unique and secret identifier (x,y,x',y') being associated with each of said RF labels.

The method may comprise the following steps:

/a/ sending a first random number from an RF label to the RF label reader;

/b/ sending a second random number from the RF label reader to the RF label;

/c/ in said RF label, encrypting the identifier of the label by executing the following steps consisting of:

generating third and fourth random numbers in accordance with a probabilistic rule;

transforming said first and second random numbers in accordance with a determined function and obtaining respective first and second transformed numbers;

obtaining a value of the encrypted identifier by combining the identifier of the label with the first and second random numbers, with the first and second transformed numbers, and with the third and fourth random numbers;

/d/ sending from the RF label to the RF label reader the value of the encrypted identifier resulting from the step /c/;

/e/ repeating the steps /a/ to /d/ N times, N being an integer;

/f/ identifying the RF label in a list of label identifiers in the label reader by determining the associated identifier as a function of N values of the encrypted identifier received, of the determined function, of the N first and second random numbers and of the probabilistic rule When the first and second random numbers are binary numbers of k bits, k being an integer, the determined function f is a permutation of the set of binary numbers of k bits that, for any pair of binary numbers δ, λ of k bits, where δ is non-zero, satisfies the following equation only for a number d of values that is less than a threshold value:

$$f(d \oplus \delta) = f(d) \oplus \lambda$$

The determined function f preferably has a level of complexity lower than a level of complexity threshold value.

When the identifier of the label comprises first, second, third and fourth binary numbers of k bits, in the step /c/, there then may be obtained a first portion z of the value of the encrypted identifier according to the following equation:

$$z = a \cdot x \oplus b \cdot y \oplus v$$

where b and a are respectively the first and second random numbers in a binary form of k bits;

where x and y are respectively the first and second binary numbers of the identifier; and where v is the third random number;

and there may be obtained a second portion z' of the value of the encrypted identifier according to the following equation:

$$z' = f(a) \cdot x' \oplus f(b) \cdot y' \oplus v'$$

where x' and y' are respectively the third and fourth binary numbers of the identifier;

where f is the determined function and where f(b) and f(a) are respectively the first and second transformed numbers; and where v' is the fourth random number.

In the step /c/, the first portion z of the value of the encrypted identifier may be provided in a first message (403) and the second portion z' of the value of the encrypted identifier may be provided in a second message (404).

The random number generation probabilistic rule may be defined so as to generate a determined number with a probability having a determined value.

A second aspect of the invention proposes an RF label in an RF label identification system comprising an RF label reader, a unique and secret identifier being associated with said RF label. The label may comprise:

a storage entity adapted to store the identifier of said label;

a random generation entity adapted on the one hand to generate a first random number and on the other hand to generate random numbers in accordance with a probabilistic rule;

a transformation entity adapted to transform a number in accordance with a determined function and to supply a transformed number;

an encryption entity adapted to encrypt the identifier of the RF label by combining the identifier with the first random number and a second random number received from the label reader, with third and fourth random numbers supplied by the generation entity, in accordance with the probabilistic rule and with first and second transformed numbers supplied by the transformation entity based on the first and second random numbers;

an interface management entity for the interface with the RF label leader adapted to send the first random number to the label reader; to receive the second random number from the label reader, and to send the value of the encrypted identifier of the label supplied by the encryption entity.

The determined function f, on which the transformation entity is based (503), when the first and second random numbers are binary numbers of k bits, k being an integer, may be a permutation of the set of binary numbers of k bits that, for any pair of binary numbers δ, λ of k bits, where δ is non-zero, satisfies the following equation only for a number d of values that is less than a threshold value:

$$f(d \oplus \delta) = f(d) \oplus \lambda$$

When the identifier of the label comprises first, second, third and fourth binary numbers of k bits, the encryption entity may supply on the one hand a first portion z of the value of the encrypted identifier in accordance with the following equation:

$$z = a \cdot x \oplus b \cdot y \oplus v$$

where b and a are respectively the first and second random numbers in a binary form of k bits;

where x and y are respectively the first and second binary numbers of the identifier; and where v is the third random number;

and may supply on the other hand a second portion z' of the value of the encrypted identifier in accordance with the following equation:

$$z'=f(a) \cdot x' \oplus f(b) \cdot y' \oplus v'$$

where x' and y' are respectively the third and fourth binary numbers of the identifier;

where f is the determined function and where f(b) and f(a) are respectively the first and second transformed numbers; and where v' is the fourth random number.

The interface management entity may send to the label leader the first portion of the value of the encrypted identifier in a first message and the second portion of the value of the encrypted identifier in a second message.

A third aspect of the invention proposes an RF label identification device in an RF label identification system comprising a plurality of RF labels, a unique and secret identifier being associated with each of said RF labels. The device may comprise:

- a random generation entity adapted to generate a random number;
- an interface management entity for the interface with said RF labels adapted to receive a first random number from an RF label, to send a second random number, generated by said random generation entity, to said RF label and to receive a value of the encrypted identifier; resulting from combination of the identifier of said label with the first and second random numbers, with first and second transformed numbers resulting from transformation of said first and second random numbers in accordance with a determined function, and with third and fourth random numbers generated in accordance with a probabilistic rule by said label;
- a storage entity adapted to store the determined function, the probabilistic rule and a list of identifiers associated with labels of the system;
- an identification entity adapted to identify said RF label by determining the associated identifier as a function of N values of the encrypted identifier received from the label by the interface management entity, of the determined function, of the probabilistic rule, of the N first and second random numbers used to provide said N values of the encrypted identifier, and of the list of identifiers stored in the storage entity.

The determined function f, when the first and second random numbers are binary numbers of k bits, k being an integer, may be a permutation of the set of binary numbers of k bits that, for any pair of binary numbers $\delta$, $\lambda$ of k bits, where $\delta$ is non-zero, satisfies the following equation only for a number d of values that is less than a threshold value:

$$f(d \oplus \delta) = f(d) \oplus \lambda$$

The determined function f has a level of complexity lower than a level of complexity threshold value.

When the identifier of the label comprises first, second, third and fourth binary numbers of k bits, the value of the encrypted identifier may comprise a first portion z satisfying the following equation:

$$z = a \cdot x \oplus b \cdot y \oplus v$$

where b and a are respectively the first and second random numbers in a binary form on k bits;

where x and y are respectively the first and second binary numbers of the identifier; and where v is the third random number;

and may comprise a second portion z' satisfying the following equation:

$$z' = f(a) \cdot x' \oplus f(b) \cdot y' \oplus v'$$

where x' and y' are respectively the third and fourth binary numbers of the identifier of the RF label;

where f is the determined function and where f(b) and f(a) are respectively the first and second transformed numbers; and where v' is the fourth random number The interface management entity may receive the first portion z of the value of the encrypted identifier in a first message and the second portion z' of the value of the encrypted identifier in a second message.

A fourth aspect of the present invention proposes an RF label identification system comprising a label identification device according to the third aspect of the present invention and a plurality of RF labels according to the second aspect of the present invention.

Other aspects, objects and advantages of the invention will become apparent on reading the description of one embodiment of the invention.

BRIEF DESCRIPTION OF THE DRAWINGS

The invention will also be better understood with the help of the drawings, wherein.

DETAILED DESCRIPTION OF THE DISCLOSURE

Figure 1:
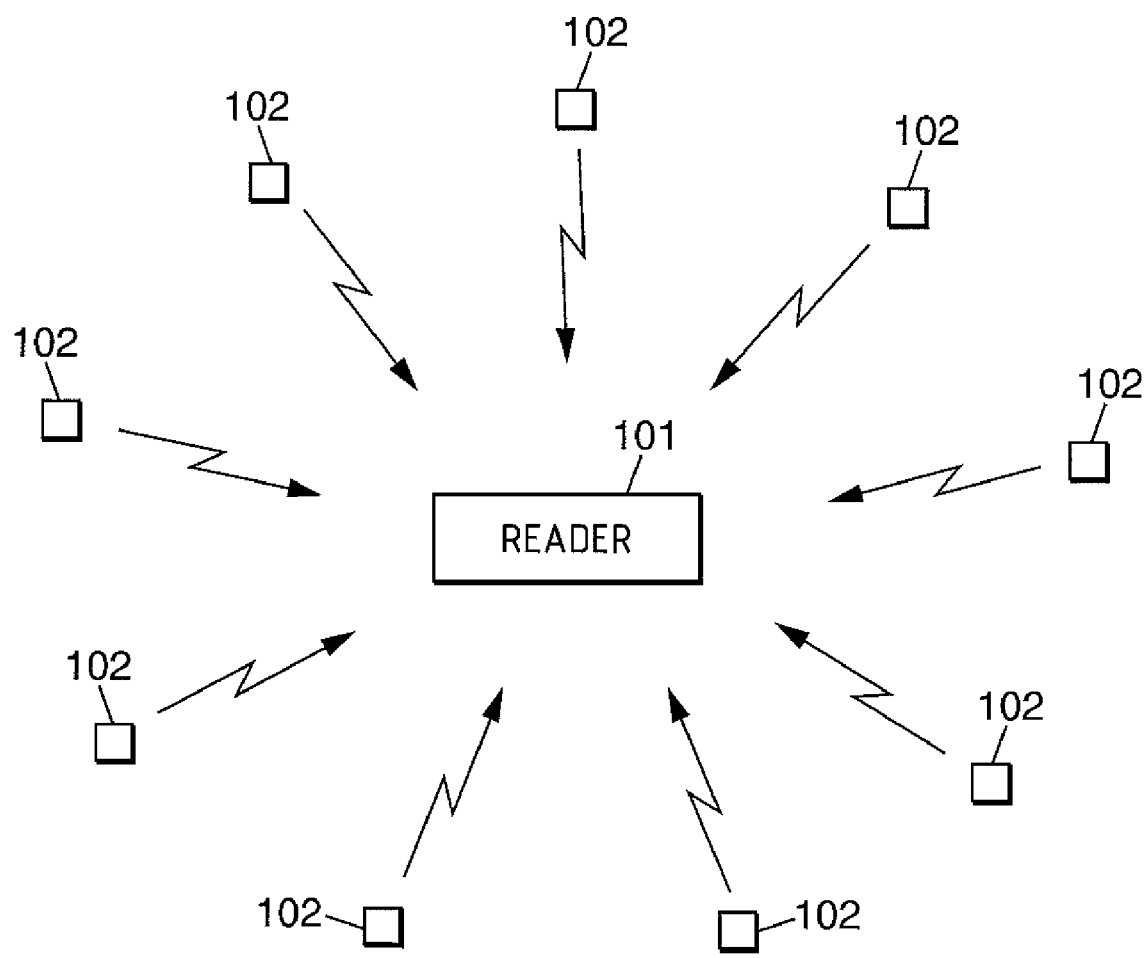
FIG. 1 shows an architecture of a prior art RF label identification system.
Figure 2:
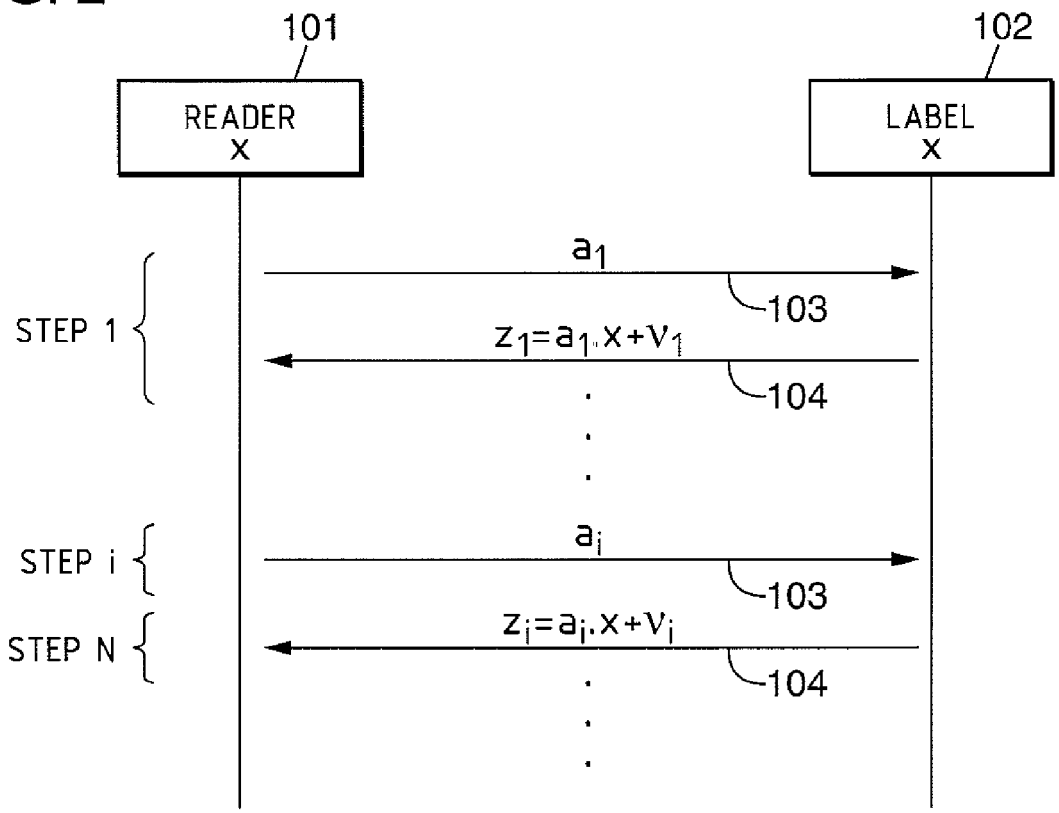
FIG. 2 shows an exchange of messages in a prior art RF identification system.
Figure 3:
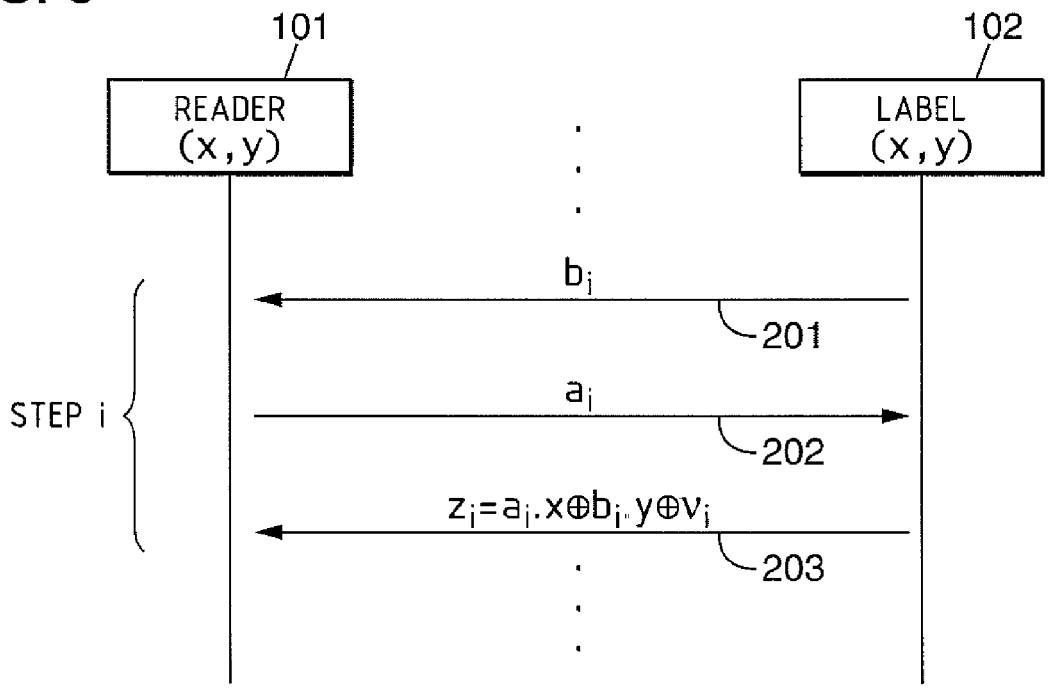
FIG. 3 shows another exchange of messages in a prior art RF identification system.
Figure 4:
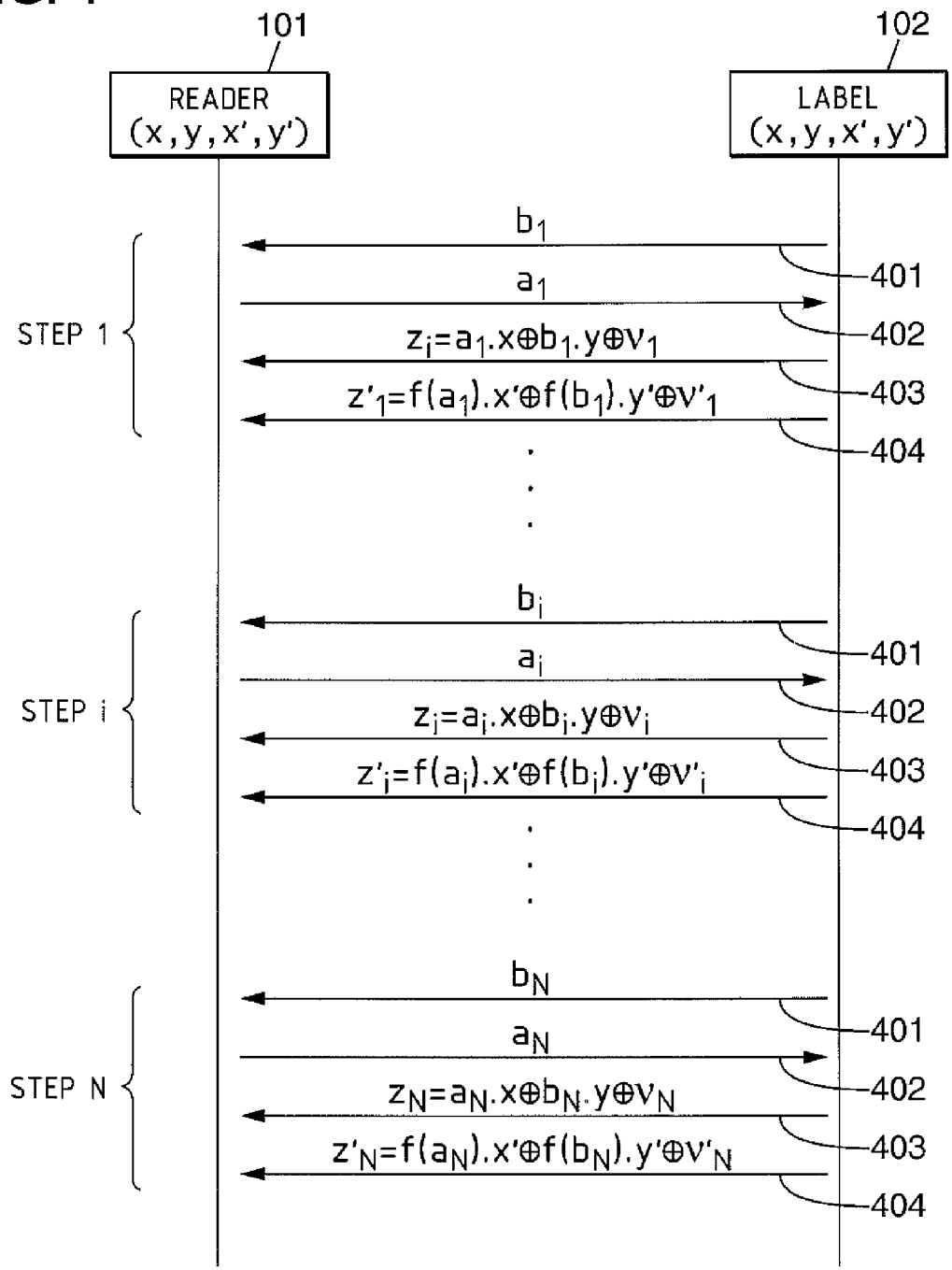
FIG. 4 shows an exchange of messages in an RF identification system according to one embodiment of the present invention.

In one embodiment of the present invention, each label 102 of the RF label identification system shown in FIG. 1 is associated with a secret identifier comprising four binary numbers x, y, x' and y' each consisting of k bits, k being an integer. FIG. 4 shows one embodiment of this kind. The label 102 is initially activated by a high-frequency or low-frequency activation signal sent by the RF label reader 101.

In an embodiment of this kind, a label is identified by repeating N times an encryption step as described hereinafter.

Accordingly, during an encryption step, step i, the label first sends a message 401 to the reader in order to send it a first random number $b_i$ that is preferably generated by said label. In response to this message 401, the reader sends the label a message 402 indicating a second random number $a_i$ that is preferably generated by said reader 101. The label then attempts to encrypt its identifier so as to protect its transmission to the reader 101.

The label preferably combines a first portion, x and y, of its identifier with the first and second random numbers, $a_i$ and $b_i$, as well as with a third random number $v_i$ generated by the label in accordance with a probabilistic rule. A combination of this kind supplies a first portion of the value of the encrypted identifier which may satisfy the following equation, for example:

$$z_i = a_i \cdot x \oplus b_i \cdot y \oplus v_i \quad (5)$$

Moreover, a second portion, x' and y', of the identifier of the label is combined on the one hand with first and second transformed numbers resulting from a transformation of the first and second random numbers in accordance with a function f known to the RF label reader 101 and the RF label 102 and on the other hand with a fourth random number $v'_i$ generated by the label in accordance with a probabilistic rule.

The second portion of the value of the encrypted identifier resulting from this combination preferably satisfies the following equation:

$$z'_i = f(a_i) \cdot x' \oplus f(b_i) \cdot y' \oplus v'_i \quad (5')$$

Accordingly, in a message 403, the RF label sends the result of combining the first portion of the value of the encrypted identifier and, in a message 404, the RF label sends the result of combining the second portion of the value of the encrypted identifier of the RF label.

Other embodiments of the present invention are easily deduced from the foregoing description. Thus, for example, the results of combining the first and second portions of the identifier of the label may be sent in one and the same message. The present invention covers all the ways of sending the various values of the encrypted identifier to the label reader.

The step as described above therefore supplies a value of the encrypted identifier of the label. This step is repeated N times. Consequently, the RF label reader receives N values of the encrypted identifier, each resulting on the one hand from a first combination of the identifier with the first and second random numbers and the third random number and on the other hand from a second combination of the identifier with the first and second transformed numbers obtained by application of the function f to the first and second random numbers, and with the fourth random number.

Note that the third and fourth random numbers are preferably generated in accordance with a generation rule that applies a determined probabilistic rule known both to the label and to the reader. Thus, for example, this probabilistic rule may enable the generation of a determined binary number with a determined probability of value η. This probability value η is known to the reader and to the label.

The probabilistic rule used is therefore defined by the fact that the third and fourth random numbers generated correspond to the binary number 1 with a determined probability η. However, the invention is not limited to this kind of probabilistic rule.

The RF label reader therefore receives N values of the encrypted identifier of the RF label 102. In one embodiment of the present invention, a value of the encrypted identifier has two portions that may be treated differently by the reader. The first portion $z_i$, respectively the second portion $z'_i$, of the value of the encrypted identifier received by the reader results from the first combination, respectively from the second combination described above.

Regardless of the method used to send the two portions of the N values of the encrypted identifier from the label to the label leader, the reader is in a position to determine the first portion z and the second portion z' of the same value of the encrypted identifier and to reconstitute the value of the encrypted identifier (z, z').

In one embodiment of the present invention, to identify the first portion of the identifier of the label, the leader seeks to determine, for the N values of the encrypted identifier received, if the following equation is satisfied, taking account of the probabilistic rule:

$$z_i = a_i \cdot x \oplus b_i \cdot y \quad (6)$$

The reader determines a portion of the identifier of the label (x,y) if equation (6) is satisfied with a probability substantially equal to 1−η.

The reader then attempts to determine the second portion of the identifier of the label. It then considers the values of the encrypted identifier and determines if the following equation, relating to the second portion of the values $z'_i$ of the encrypted identifier, is satisfied with a probability substantially equal to 1−η:

$$z'_i = f(a_i) \cdot x' \oplus f(b_i) \cdot y' \quad (7)$$

If this is the case, the second portion of the label has also been determined and the reader has therefore identified the RF label.

This kind of method of encrypting the identifier of the label (x,y,x',y') advantageously provides protection against active attacks if the transformation function used to transform the first and second random numbers satisfies certain specific characteristics.

To this end, this kind of transformation function f may be defined by specifying that f is a permutation of the set $\{0,1\}^k$ and that, for any pair of binary numbers of k bits (δ, λ) where δ is non-zero, the maximum number M of values d of the set $\{0,1\}^k$ for which the function f satisfies the following equation is relatively low:

$$f(d \oplus \delta) = f(d) \oplus \lambda \quad (8)$$

It can therefore be specified that the maximum number M is less than a threshold value such that it is possible to consider that the equation (8) is rarely satisfied in the set $\{0,1\}^k$, for a constant pair of values (δ, λ).

Accordingly, if the function f verifies this kind of probability characteristic, an active attack such as that described in the document 'An active attack against HB+' cited above, for example, proves to be in vain.

Under such conditions, if an active attack replaces the second random number $a_i$ with a number $a'_i$ satisfying equation (3) wherein δ is a number of constant value during the repetitions of the encryption step, the reader receives values of the encrypted identifier having a second portion that satisfies the following equation:

$$z'_i = f(a_i \oplus \delta) \cdot x' \oplus f(b_i) \cdot y' \oplus v'_i \quad (9)$$

Under such conditions, whether the reader identifies the label or not, the attack cannot work its way back to the value of the identifier.

In fact, since the function f has the characteristic stated above, i.e. since there are relatively few values $a_i$ which, for any pair (δ, λ), satisfy equation (8), an attack of this kind is not able to deduce a value of the identifier of the label as a function of the identification or the non-identification of the label by the reader.

As a result, in one embodiment of the present invention, the exchanges of messages between the reader and an RF label for the purpose of identifying the label are resistant to active attacks on the secrecy of the identifier of the RF label.

This kind of transformation function preferably also has a relatively low level of complexity. In fact, as RF labels generally do not have very significant computation capacities, it is necessary to limit the computation power required to encrypt the RF label identifiers.

Numerous transformation functions having the characteristic stated with reference to equation (8) and having a relatively low level of complexity may be constructed and used in an RF identification system according to one embodiment of the present invention.

Such functions can easily be constructed using various methods. One example of the construction of this kind of transformation function f is described hereinafter.

For a given number k, the function f is a permutation of the set $\{0,1\}^k$. Two numbers m and n are determined such that the following equation is satisfied:

$$k = m \cdot n \quad (11)$$

It is then possible to construct the determined function f from an integer number n of functions $g_1$ to $g_n$, each of which is defined in the set of binary numbers $\{0,1\}^m$. These n functions $g_1$ to $g_n$ are permutations of low complexity. Moreover, these functions each have a low and limited maximum number G of values of p, for p element of the set $\{0,1\}^m$, for which the following equation is satisfied, for i from 1 to n:

$$g_i(p \oplus \delta) = g_i(p) \oplus \lambda \quad (12)$$

where $\delta$ is non-zero and $\delta, \lambda$ are elements of the set $\{0,1\}^m$.

In order for the determined function f to benefit from the characteristics of the functions $g_1$ to $g_n$ stated in relation to equation (12) and in relation to the level of complexity, f may advantageously be constructed using the following equation:

$$f(q) = (g_1(q_0, \ldots, q_{m-1}), g_2(q_m, \ldots, q_{2m-1}), \ldots, g_n(q_{k-m}, \ldots, q_{k-1})) \quad (13)$$

where $q = (q_0, \ldots, q_{k-1})$ in the set $\{0,1\}^k$.

In this kind of context, the values of the numbers m and n are determined and the functions $g_1$ to $g_n$ are determined as a function of the maximum number M and the level of complexity threshold value to be complied with for the determined function f.

For example, for an odd number m, it is possible to choose functions $g_i$, for i from 1 to n, such that they transform an element p into an element $p^3$ in the finite body L with $2^m$ elements, where L is in a one-to-one relationship with the set $\{0,1\}^m$. In a situation of this kind, there is obtained for each of the functions $g_i$ a maximum number G of values p satisfying equation (12) that is equal to 2.

Consequently, there is obtained a maximum number M equal to $2^{k-m+1}$ of values $a_i$ from the set $\{0,1\}^k$ satisfying equation (8).

Figure 5:
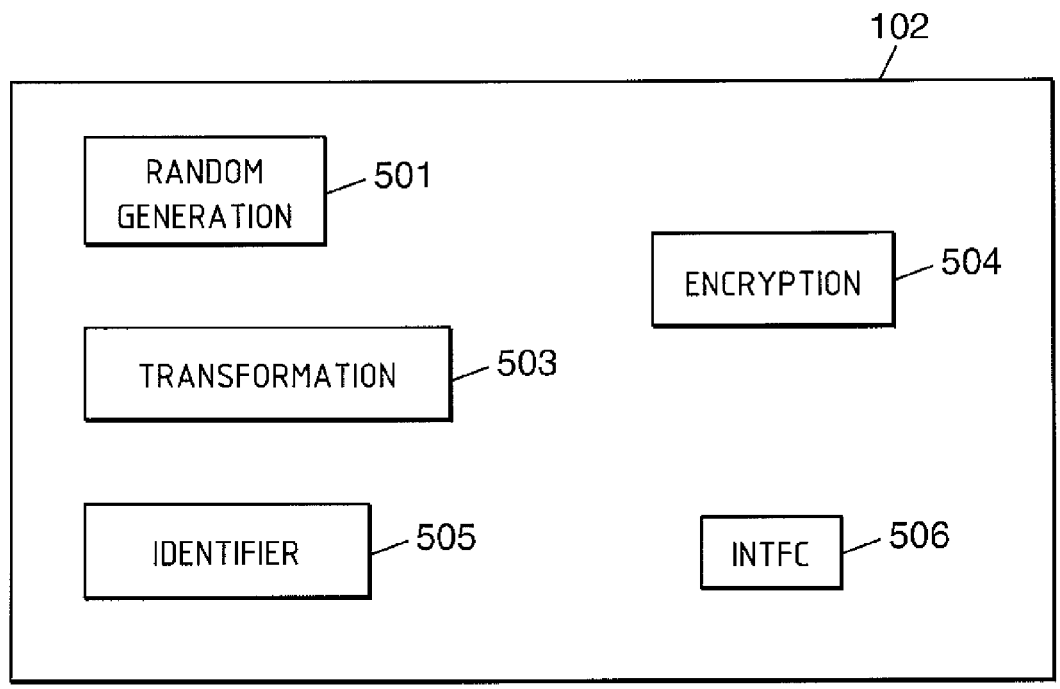
FIG. 5 shows an RF label architecture according to one embodiment of the present invention.

FIG. 5 shows an RF label according to one embodiment of the present invention. It comprises a storage entity 505 adapted to store the identifier of the label. It further comprises a random generation entity 501 adapted to generate the first random number $b_i$ sent to the reader in a message 401, this generation being effected in accordance with a uniform rule. This kind of entity is also adapted to generate third and fourth random numbers in accordance with a determined probabilistic rule. It further includes a transformation entity 503 adapted to transform a number in accordance with the determined function f and to supply a transformed number. This transformation entity therefore supplies the first and second transformed numbers that are then combined with the identifier of the label to obtain the second portion of the value of the encrypted identifier.

A label according to one embodiment of the present invention further comprises an encryption entity 504 adapted to encrypt the identifier of the RF label by combining that identifier with the first random number supplied by the random generation entity 501 and the second random number received from the label reader with the third and fourth random numbers and with the first and second random numbers transformed by the transformation entity 503.

This label 102 then comprises an interface management entity 506 for the interface with the RF label reader adapted to send the first random number $b_i$ to the label reader, to receive the second random number $a_i$ from the label reader and to send a value $z_i$, $z_i'$ of the encrypted identifier of the label.

Figure 6:
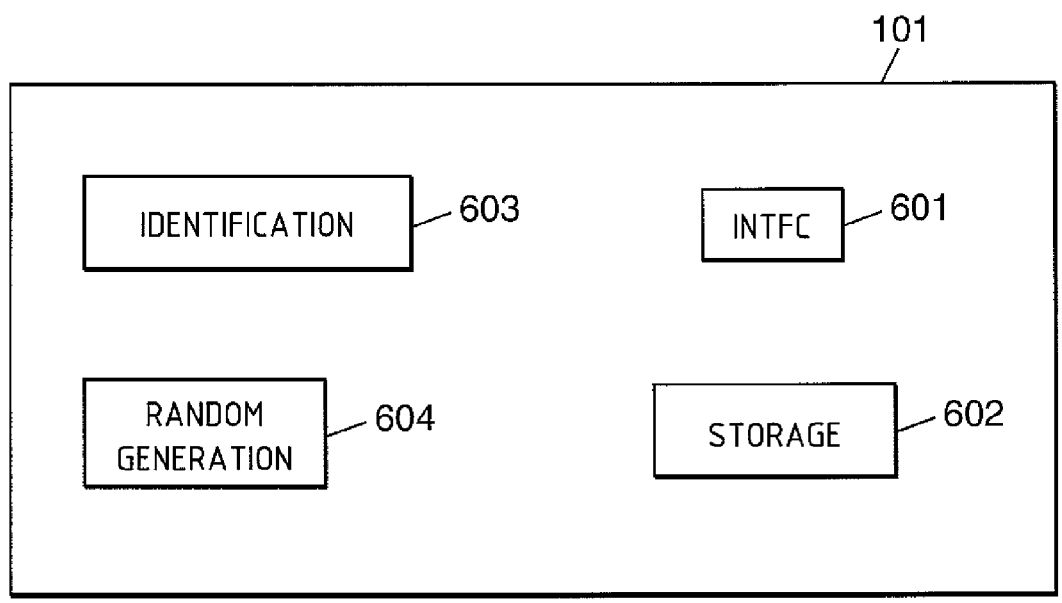
FIG. 6 shows an RF label reader architecture according to one embodiment of the present invention.

FIG. 6 shows an RF label reader according to one embodiment of the present invention. This kind of reader 101 comprises an interface management entity 601 for communicating with the RF labels of the RF identification system. This kind of entity is adapted to receive the first random number $b_i$ from an RF label 102, to send the second random number $a_i$ to the RF label and to receive a value of the encrypted identifier resulting from combining the identifier of the label with the first and second random numbers and the first and second random numbers transformed by the determined function, and with the third and fourth random numbers generated in accordance with the probabilistic rule.

This kind of reader further comprises a storage entity 602 adapted to store the determined function f, the probabilistic generation rule and a list of identifiers associated with labels of the system. It also includes an identification entity 603 adapted to identify the RF label by determining the associated identifier as a function of the N values of the encrypted identifier received from the label to be identified, of the determined function f, of the probabilistic generation rule, of the N first and second random numbers and of the list of identifiers stored in the storage entity 602. It also comprises a random number generation entity.

The invention claimed is:

1. A method of identifying an RF label in an RF label identification system comprising an RF label reader and a plurality of RF labels, a unique and secret identifier being associated with each of said RF labels;

said method comprising the following steps:

/a/ sending a first random number from an RF label to the RF label reader;

/b/ sending a second random number from the RF label reader to the RF label;

/c/ in said RF label, encrypting the identifier of the label by executing the following steps consisting of:

generating third and fourth random numbers in accordance with a probabilistic rule;

transforming said first and second random numbers in accordance with a determined function and obtaining respective first and second transformed numbers;

obtaining a value of the encrypted identifier by combining the identifier of the label with the first and second random numbers, with the first and second transformed numbers, and with the third and fourth random numbers;

/d/ sending from the RF label to the RF label reader the value of the encrypted identifier resulting from the step /c/;

/e/ repeating the steps /a/ to /d/ N times, N being an integer;

/f/ identifying said RF label in a list of label identifiers in the label reader by determining the associated identifier as a function of N values of the encrypted identifier received, of the determined function, of the N first and second random numbers and of the probabilistic rule.

2. The identification method according to claim 1, wherein, the first and second random numbers being binary numbers of k bits, k being an integer, the determined function f is a permutation of the set of binary numbers of k bits that, for any pair of binary numbers $\delta, \lambda$ of k bits, where $\delta$ is non-zero, satisfies the following equation only for a number of values d that is less than a threshold value:

$$f(d \oplus \delta) = f(d) \oplus \lambda.$$

3. The identification method according to claim 1, wherein the determined function f has a level of complexity lower than a level of complexity threshold value.

4. The identification method according to claim 2, wherein the identifier of the label comprising first, second, third and fourth binary numbers of k bits, in the step /c/, there is obtained a first portion z of the value of the encrypted identifier according to the following equation:

$$z = a \cdot x \oplus b \cdot y \oplus v$$

where b and a are respectively the first and second random numbers in a binary form of k bits;
where x and y are respectively the first and second binary numbers of the identifier; and
where v is the third random number;
and there is obtained a second portion z' of the value of the encrypted identifier according to the following equation:

$$z' = f(a) \cdot x' \oplus f(b) \cdot y' \oplus v'$$

where x' and y' are respectively the third and fourth binary numbers of the identifier;
where f is the determined function and where f(b) and f(a) are respectively the first and second transformed numbers; and
where v' is the fourth random number.

5. The identification method according to claim 4, wherein, in the step /c/, the first portion z of the value of the encrypted identifier is sent in a first message (403) and the second portion z' of the value of the encrypted identifier is sent in a second message (404).

6. The identification method according to claim 1, wherein the random number generation probabilistic rule is defined so as to generate a determined number with a probability having a determined value.

7. An RF label identification system comprising a label identification device in an RF label identification system comprising at least one RF label, a unique and secret identifier being associated with said RF label;
said device comprising:
a random generation entity adapted to generate a random number;
an interface management entity for the interface with said RF labels adapted to receive a first random number from an RF label, to send a second random number, generated by said random generation entity, to said RF label and to receive a value of the encrypted identifier, resulting from combination of the identifier of said label with the first and second random numbers, with first and second transformed numbers resulting from transformation of said first and second random numbers in accordance with a determined function, and with third and fourth random numbers generated in accordance with a probabilistic rule by said label;
a storage entity adapted to store the determined function, the probabilistic rule and a list of identifiers associated with labels of the system; and
an identification entity adapted to identify said RF label by determining the associated identifier as a function of N values of the encrypted identifier received from the label by the interface management entity, of the determined function, of the probabilistic rule, of the N first and second random numbers used to provide said N values of the encrypted identifier, and of the list of identifiers stored in the storage entity
said label comprising:
a storage entity adapted to store the identifier of said label;
a random generation entity adapted on the one hand to generate a first random number and on the other hand to generate random numbers in accordance with a probabilistic rule;
a transformation entity adapted to transform a number in accordance with a determined function and to supply a transformed number;
an encryption entity adapted to encrypt the identifier of the RF label by combining the identifier with the first random number and a second random number received from the label reader, with third and fourth random numbers supplied by the generation entity in accordance with the probabilistic rule, and with first and second transformed numbers supplied by the transformation entity based on the first and second random numbers;
an interface management entity for the interface with the RF label reader adapted to send the first random number to the label reader, to receive the second random number from the label reader, and to send the value of the encrypted identifier of the label supplied by the encryption entity.

8. The RF label identification system according to claim 7, wherein the determined function f, on which the transformation entity is based, when the first and second random numbers are binary numbers of k bits, k being an integer, is a permutation of the set of binary numbers of k bits that, for any pair of binary numbers $\delta$, $\lambda$ of k bits, where $\delta$ is non-zero, satisfies the following equation only for a number of values d that is less than a threshold value:

$$f(d \oplus \delta) = f(d) \oplus \lambda.$$

9. The RF label identification system according to claim 7, wherein the determined function f, on which the transformation entity is based, has a level of complexity lower than a threshold value.

10. The RF label identification system according to claim 9, wherein, the identifier of the label comprising first, second, third and fourth binary numbers of k bits, the encryption entity supplies on the one hand a first portion z of the value of the encrypted identifier in accordance with the following equation:

$$z = a \cdot x \oplus b \cdot y \oplus v$$

where b and a are respectively the first and second random numbers in a binary form on k bits;
where x and y are respectively the first and second binary numbers of the identifier; and
where v is the third random number;
and supplies on the other hand a second portion z' of the value of the encrypted identifier in accordance with the following equation:

$$z' = f(a) \cdot x' \oplus f(b) \cdot y' v'$$

where x' and y' are respectively the third and fourth binary numbers of the identifier; where f is the determined function and where f(b) and f(a) are respectively the first and second transformed numbers; and
where v' is the fourth random number.

11. The RF label identification system according to claim 10, wherein, the interface management entity sends to the label reader the first portion of the value of the encrypted identifier in a first message and the second portion of the value of the encrypted identifier in a second message.

12. The RF label identification system according to claim 7, wherein the determined function f, when the first and second random numbers are binary numbers of k bits, k being an integer, is a permutation of the set of binary numbers of k bits that, for any pair of binary numbers δ, λ of k bits, where δ is non-zero, satisfies the following equation only for a number of values d that is less than a threshold value:

$$f(d \oplus \delta) = f(d) \oplus \lambda.$$

13. The RF label identification system according to claim 7, wherein the determined function f has a level of complexity lower than a level of complexity threshold value.

14. The RF label identification system according to claim 7, wherein, the identifier of the label comprising first, second, third and fourth binary numbers of k bits, the value of the encrypted identifier comprises a first portion z satisfying the following equation:

$$z = a \cdot x \oplus b \cdot y \oplus v$$

where b and a are respectively the first and second random numbers in a binary form on k bits;

where x and y are respectively the first and second binary numbers of the identifier; and where v is the third random number;

and comprises a second portion z' satisfying the following equation:

$$z' = f(a) \cdot x' \oplus f(b) \cdot y' \oplus v'$$

where x' and y' are respectively the third and fourth binary numbers of the identifier of the RF label;

where f is the determined function and where f(b) and f(a) are respectively the first and second transformed numbers; and where v' is the fourth random number.

15. The RF label identification system according to claim 7, wherein the interface management entity receives the first portion z of the value of the encrypted identifier in a first message (403) and the second portion z' of the value of the encrypted identifier in a second message (404).

* * * * *